UNITED STATES PATENT OFFICE.

LOUIS WEISBERG, OF GRANTWOOD, NEW JERSEY, ASSIGNOR TO THE BARRETT COMPANY, A CORPORATION OF NEW JERSEY.

RESIN-SHELLAC COMPOSITION.

1,413,144.  Specification of Letters Patent.  Patented Apr. 18, 1922.

No Drawing.  Application filed February 19, 1921. Serial No. 446,510.

*To all whom it may concern:*

Be it known that I, LOUIS WEISBERG, a citizen of the United States, residing at Grantwood, in the county of Bergen and State of New Jersey, have invented certain new and useful Improvements in Resin-Shellac Compositions, of which the following is a specification.

This invention relates to new and useful compositions of matter containing resinous products, which are also referred to as glycerol-polybasic acid resins, and processes for making the same.

It has been known for a number of years that resinous bodies are formed on heating together, under suitable conditions, a polyhydric alcohol and one or more polybasic organic acids, but the products hitherto made by this method have been unsuited for many uses, such as molded or impregnated electrical insulation, varnishes, and lacquers, by reason of their lack of resistance to water. After only a few minutes contact with water, most of them show signs of being attacked; the surface becomes dull and white, while if the water contact continues, the entire resin becomes soft and crumbly, finally losing its shape altogether. This action is more rapid with hot water, particularly boiling water. The uses to which these materials can be put are reduced in number by this lack of resistance to water. By the present invention a material is produced which has a satisfactory water-resistance for many purposes and which is well adapted to replace shellac in part, or entirely, in a variety of its applications.

Most of the resinous condensation products mentioned above are, or can be, made, for example, from glycerol and phthalic anhydride, with or without the addition of certain polybasic aliphatic acids, such as succinic, malic, maleic, fumaric, citric, malomalic, or tartaric acid. The necessity of adding other acids arises from the well and long recognized fact that such glycerol products made from phthalic anhydride alone are too brittle for many uses; but the increase of mechanical strength by this means is generally accompanied by a sacrifice of resistance to water. These resins may be made substantially inert to water by proper heat treatment.

There are three classes of these condensation products which I may utilize:

*Class A.*—Initial condensation product; soluble in acetone; fusible; melting point seldom exceeds 120° C. (temperatures throughout this specification are on the centigrade scale); not resistant to cold water; passes on further heating into a resin of Class B.

*Class B.*—Intermediate condensation product; insoluble in acetone; infusible; can be molded under heat and pressure; not resistant to cold water; passes on suitable heat treatment into a resin of Class C.

*Class C.*—Final condensation product; insoluble in acetone; infusible; can be molded under heat and pressure; resistant to cold water and to boiling water.

The methods of preparation of these three classes of resins may be briefly described as follows:

A polybasic alcohol such as glycerol or glycol for example, is heated with a polybasic aromatic acid, such as phthalic, diphenic, 1.8 naphthalic, or with various benzoyl-benzoic acids, such as chlor-benzoyl-benzoic, methyl-benzoyl-benzoic acid, or with a mixture of one or more of these acids. A polybasic aliphatic acid, such as succinic, tartaric, malic, maleic, citric, malomalic, etc., may be substituted wholly or in part for the aromatic acid, and the heating is continued for several hours at a temperature preferably below 200° C. until the product loses its stickiness but still possesses the characteristics above set forth for Class A resins. For Class B resins the heating is continued for several hours, preferably at a temperature below 135° C. to prevent frothing, until the product becomes infusible and possesses the other characteristics above set forth for Class B resins. In order to produce Class C resins above described, the product of Class B may be further heated with slow increase of temperature for a long period (24 hours or more) at a temperature as high as 250° C., the temperature being permitted to rise slowly at first.

My invention rests on my discovery that when any of the three classes of resins above is compounded with a suitable proportion of shellac, the so-resulting compound or product or composition of matter may be used for many of the purposes for which shellac is commonly used without impairing the product, as do many of the gums commonly used to replace shellac in whole or in part. For example, when one of the soluble resins is employed, the product or composition may be used either as a varnish or as a molding composition. When an insoluble resin is employed the product is useful as a molding composition. I have found that in using resins of Class A or Class B, the water-resisting quality of the molded composition as a whole is excellent, provided that the weight of resin does not materially exceed the weight of the shellac compounded therewith.

Various methods of mixing the resin and shellac may be employed. When the resin is soluble, it and the shellac are perhaps most simply mixed by dissolving them in any suitable solvent, such as acetone, alcohol, or ethyl acetate, for example. If the mixture is to be used as a varnish, this is especially advantageous, for then the solvent need not be evaporated. When the resin is fusible the two substances may be melted and thoroughly mixed in the molten condition, but this method is not always a convenient one to carry out. A useful method is to grind each material separately to a fine powder, and then mix them thoroughly by mechanical means. The product obtained in this way is suitable for some hot molding processes. For many purposes, however, it is preferable to grind the two materials separately, moisten each separately with acetone, alcohol or ethyl acetate, and mix them in this moistened condition in a dough-mixing machine or between mixing rolls. This procedure is especially adapted to resins of Class A and Class B. The method of mixing will in general be adapted to fit best with the purpose for which the material is to be employed. This invention is not limited to any prescribed mode of compounding the resin and shellac.

All of these mixtures may contain suitable fillers, such as asbestos, cotton, wood pulp, talc, powdered stone, and other inert powdery materials, as well as the shellac and above-mentioned resins, when desirable, and the amount of shellac present is preferably at least as great as that of such resin.

The mixtures containing shellac mold more quickly than do the resins themselves, have no tendency to stick in the mold, and the molding process does not require to be followed by a heat treatment. The products containing not less than the specified amount of shellac are substantially equal to shellac in water resistance, while in mechanical strength and dielectric properties they may even be superior to shellac. The term "glycerol polybasic acid resins," as used in the claims, is to be interpreted broadly so as to cover all the classes of resins hereinbefore mentioned. It is also to cover resins made from polyglycerols or polyglycolls, such as are described in copending application Ser. No. 446,509, filed February 19, 1921.

I use compositions of matter in the appended claims independently of form, shape or condition and whether molded or not.

I claim:

1. A composition of matter comprising shellac and a glycerol polybasic acid resin.
2. A composition of matter comprising shellac and a glycerol dibasic acid resin.
3. A composition of matter comprising shellac, a glycerol polybasic acid resin and a filler.
4. A composition of matter comprising shellac, a glycerol dibasic acid resin and a filler.
5. A composition of matter comprising shellac and a glycerol polybasic aliphatic acid resin.
6. A composition of matter comprising shellac and a resin formed from a polyhydric alcohol and a polybasic acid.

In testimony whereof I affix my signature.

LOUIS WEISBERG.